May 24, 1966  J. R. PERILHOU ET AL  3,252,868

FUEL ELEMENT FOR USE IN NUCLEAR REACTORS

Filed June 3, 1960

INVENTORS
J.R. PERILHOU &
G. LE GARGASSON
BY
Frank R. Trifari
AGENT

INVENTORS
J. R. PERILHOU &
G. LE GARGASSON
BY
Frank R. Trifari
AGENT

United States Patent Office 3,252,868
Patented May 24, 1966

3,252,868
FUEL ELEMENT FOR USE IN NUCLEAR
REACTORS
Jean Robert Perilhou, Bourg-la-Reine, and Georges Le
Gargasson, Paris, France, assignors to North American
Philips Company, Inc., New York, N.Y., a corporation
of Delaware
Filed June 3, 1960, Ser. No. 33,732
Claims priority, application France, June 3, 1959,
796,455; Feb. 26, 1960, 819,663
4 Claims. (Cl. 176—67)

The invention relates to a fuel element for use in nuclear reactors, which element consists of a sheath inside of which the fissionable material is arranged.

It is known to use materials for the sheath of fuel elements, which materials have not only a small effective cross sectional area for trapping neutrons traveling towards the fuel, but also a maximum transmission of heat released by the fission from the fuel to the outer side of the envelope and, are, moreover, not affected by neutrons. The sheath separates the coolant from the fuel with a view to infection and to chemical reactivity. The transmission of heat takes place by thermal conduction and to this end it is important that there should be an optimum metallic coherence between the fuel and the sheath. However, it often occurs that during the fission of the fuel element a variation in the metallic coherence is involved in a deformation of the contacts between the sheath and the fuel, which affects adversely the conduction of the fission heat to the coolant.

The fuel elements according to the invention mitigate these disadvantages. The invention is based on the recognition of the fact that the heat released by the fission of the fuel can be conducted away, even in the case of a less intimate coherence of the fuel and the sheath, if the fuel element is constructed so that the heat transport can be performed by infrared radiation. In accordance with the invention the sheath is pervious to infrared radiation. The heat conduction takes place, in this case, mainly by radiation, so that the transmission is independent of the contacts between the various parts of the fuel element. Moreover, contrary to the case of heat transmission by conduction, no gas bubbles are produced on the outer surface of the sheath, which bubbles also detract from the heat transmission to the outer side.

Particularly suitable materials for the sheath are quartz and other silicon compounds, which allow infrared radiation to pass. These materials also have a small effective sectional area for trapping neutrons and they are physically not affected by neutrons. With quartz, for example, the effective section is smaller than 0.10 barn; it has a high permeability for infrared radiation and a high resistance to thermal shocks; it is physically not affected by neutrons; the fusion temperature exceeds 1100° C. and, in certain cases, it exhibits a thermal conduction of the order of that of graphite exposed to a flow of neutrons. The last-mentioned property permits of adding to the heat transmission by infrared radiation a heat transmission by thermal conduction, each time when the fuel is more or less in contact with the sheath. The high resistance to thermal shocks with quartz permits of materially increasing the operational temperature of the reactor and hence that of the coolant so that the efficiency of the thermal machine for example a turbine coupled with the reactor is increased.

In a particular embodiment of the invention the sheath has a metal skeleton in the form of a grating. The rigidity of the sheath is thus enhanced and the skeleton grating permits the infrared radiation to pass through the interstices. The skeleton may be made for example of corrosion-free steel.

The fissile material, the fuel, may be available in the sheath in different forms. If powder or a granular form is used the fuel may be introduced gradually from above into the tubes constituting the sheaths of the elements and after use it may be conducted away at the lower end. With this embodiment of the invention any bad contact between the sheath and the fuel does not affect adversely the efficiency of a reactor. The fuel may consist for example of oxides or carbides of uranium or plutonium or other compounds of these elements.

In a further embodiment crucibles are provided inside the sheath, which crucibles consist, for example, of graphite, in which the fissile material is provided. It may be provided in the form of a powder or of compressed, sintered or non-sintered rings. The crucibles may be piled up.

The arrangement according to the invention permits, in particular, a higher temperature in the fission of the fuel. This has the advantage that the temperature of the coolant is raised, which involves an increase in thermal efficiency. To this end the arrangement is such that between the inner surface of the sheath and the corresponding outer surface of the fuel or of the member containing the fuel provision is made of means which hold the said outer surface spaced apart from the said inner surface and which are in contact with each of these surfaces only partly. These means may consist, for example, of adjusting rings of alumina. With this arrangement according to the invention compact bodies of the fissile material are particularly suitable, since in this case the developed heat is directly transmitted towards the sheath and across the sheath, in contradistinction to the case in which the fuel is held in a crucible, for example, of graphite, which crucible is heated by the fuel and then emits heat, which is transported by infrared radiation towards the sheath and across the sheath. The compact fuel bodies may for example, be formed in the shape of a ring. This structure permits temperatures up to 1500° C. and even to 2000° C. As a matter of course, the adjusting rings are constructed so that thermal conduction via these rings is at a minimum. The heat transport by conduction may be reduced further during the use of the fuel element by providing a vacuum of, for example, $10^{-1}$ to $10^{-2}$ mm. Hg inside the sheath.

With a nuclear reactor in which use is made of a fuel element according to the invention the moderation may be provided for in a particular manner. In this case a neutron-absorbing fluid flows between the sheath and the fuel. By varying the physical parameters or the chemical composition of the said fluid or gas, the number of absorbed neutrons may be varied, so that the fission of the fuel can be controlled.

During the use of the fuel element it is circumcirculated by the coolant. The nuclear reactor may be constructed so that this coolant passes through a duct in the solid moderator. The heat transmission to the coolant then takes place by the contact between the coolant and the outer wall of the sheath of the fuel element, by the absorption of the emitted radiation by the coolant and by the contact between the coolant and the inner wall of the moderator duct, heated by the radiation. If the moderator consists, for example, of graphite, it absorbs a high quantity of heat. In order to enlarge the surface of the solid moderator and of the coolant the wall of the duct in the solid moderator containing the fuel element circumcirculated by the coolant has preferably toothlike extensions. These extensions may be, in particular, shaped in the form of screw-threaded elevations.

The fuel elements according to the invention may also be used in so-called fast reactors which do not comprise a moderator. The radiant energy emitted by the fuel element, not directly absorbed by the coolant, is to be supplied to the coolant in a different way. In particular each fuel element circumcirculated by the coolant is, in this case, arranged in a separate duct, of which the wall forms a unit with that of the adjacent duct and absorbs the infrared radiation. The walls of the ducts are preferably coated with a layer of infrared-radiation-absorbing material. The material of the wall itself need not fulfill requirements with respect to the absorption of infrared radiation. Suitable material is, for example, corrosion-free nickel-chromium steel, which has been suitably oxidized, so that a surface layer of nickel oxide and chromium oxide is obtained, which layer absorbs infrared radiation. As an alternative, use may be made of a layer of iron, steel or molybdenum, to which an aluminum layer is applied, which is treated at a suitable temperature, for example, in excess of 660° C. in a reducing gas or air.

The walls are preferably corrugated or provided with tooth-like extensions to increase the thermal contact between the wall and the coolant.

The invention will now be described more fully with reference to a few figures.

Corresponding parts of the arrangement are designated in the various figures by the same reference numerals.

Figure 1:
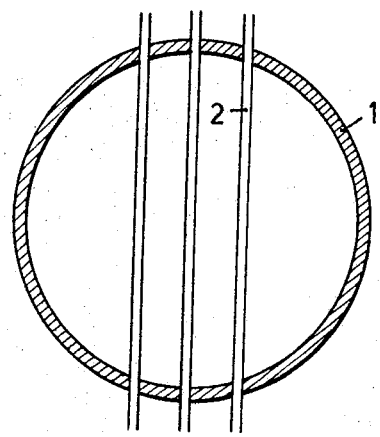
FIG. 1 is a very diagrammatical sectional view of a few parts of a nuclear reactor.

FIG. 1 shows the reactor very diagrammatically by an envelope 1, consisting of steel of a thickness of a few centimetres, through which the tubes 2 are taken, which serve as sheaths for the nuclear fuel and of which only a few are shown. The further parts of the reactor, for example, the ducts for circulation and the outlet of the coolant and the moderator are not shown. The tubes 2, which have a diameter of a few centimetres, and a thickness of a few millimetres may have a length of some few metres. In accordance with the invention they consist, for example, of quartz glass of suitable purity or of a different suitable silicon compound, for example, silicon carbide.

The nuclear fuel, preferably uranium or plutonium oxide in the form of powder or of grains, is introduced gradually from above into the tubes 2 and is conducted away, after use, at the lower end by suitable control-members (not shown). The principal advantage of this method of supplying nuclear fuel is that the dismantling of the fuel after use is avoided, which is otherwise required, if the fuel is used, for example, in the form of compact rods. Moreover, the gases evolved during the fission of the fuel can readily escape at the top end of the tubes.

The material of the sheath is permeable to infrared radiations, which permits an easy and efficient transmission of the fission heat to the coolant and the moderator without the contacts between the sheath and the fuel affecting in any way the heat transmission by radiation. Since, moreover, quartz and a few other silicon compounds have a certain degree of thermal conduction, the contacts which may be established between the sheath and the fuel will add to the heat transmitted by radiation a certain quantity of heat transmitted by conduction.

Figure 2:
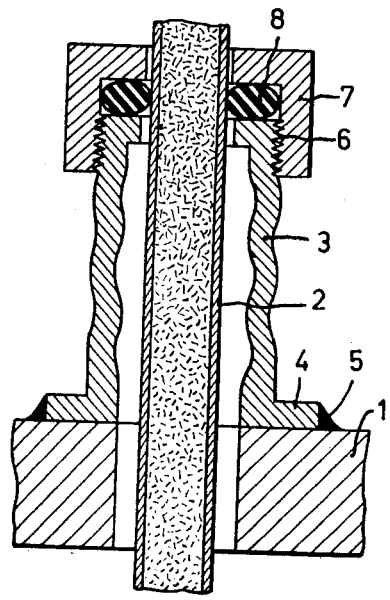
FIG. 2 is a sectional view of an impermeable connection between the wall of the fuel and the sheath of the fuel and the envelope of the reactor.

FIG. 2 shows, in a sectional view, one embodiment of a connection between the envelope 1 of the reactor and each of the tubes 2, which connection can ensure a complete impermeability and can withstand a pressure of a few hundreds of kilogrammes per square centimetre. A body 3, which has a certain degree of elasticity, is secured to the envelope 1 by its thickened part 4, for example by a soldering joint 5. The outer side of this body is provided at the top end with screw thread 6, onto which a pressure nut 7 can be screwed, which serves to flatten the circular joint 8 against the tube 2. When using adequately long bodies 3, for example, of corrosion-free steel, such a temperature gradient is obtained that the joint 8, consisting of plastic material or of metal is subjected only to a temperature at which the impermeability is not likely to be deteriorated, although the envelope 1 is heated to a temperature of several hundred degrees. The tubes 2 are capable of withstanding high pressure. Experiments showed that a pressure of 133 kgs./cm.$^2$ had to be attained before a quartz tube of a thickness of 2 mms. and a diameter of 30 mms. broke down. Yet, if desired, in order to increase the resistance, a stainless steel skeleton may be incorporated in the quartz, for example, in the form of net-shaped grating with adequate interstices to avoid a marked modification of the effective sectional area and a disturbance of the permeability of the quartz for infrared radiation.

Figure 3:
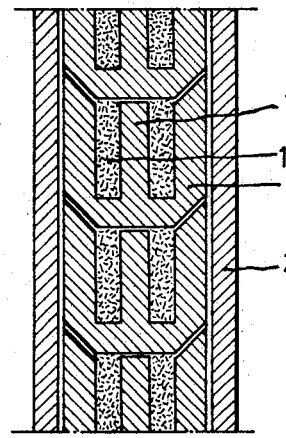
FIGS. 3, 4 and 5 are cross sectional views of fuel elements according to the invention.

FIG. 3 shows in a sectional view a further embodiment of the invention. Inside each of the tubes 2 (with a sufficient amount of play with a view to expansion; in FIG. 3, as well as in the further figures, indicated symbolically by an interstice between the various parts of the elements shown) provision is made of crucibles 10, for example, of graphite or silicon carbide, which are of an accurate, relative fit and in which the fuel 11, preferably in the form of compressed, sintered or non-sintered powder is arranged. The amount of play provided between the crucibles and the corresponding tube parts particularly permits the gaseous fission products to escape.

If use is made of graphite crucibles, which are little pervious to infrared rays, the fission heat is transmitted to the side surface of the crucibles by thermal conduction; this side surface emits the fission heat by radiation through the walls of the tubes 2.

Each crucible 10 comprises preferably a cylindrical central part 12 so that the fuel is arranged in the form of a ring in order to facilitate the fission by the neutrons and the emission of the developed heat.

Figure 4:
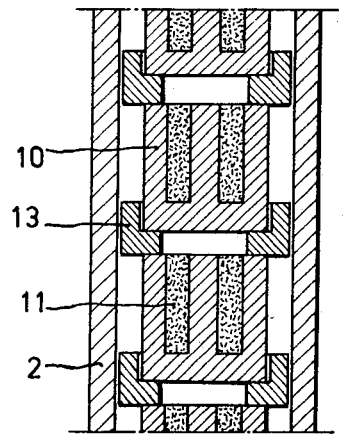

FIG. 4 shows in a cross sectional view a different embodiment of a fuel element according to the invention. If the temperature at which the fission of the fuel takes place is to be raised to 1500° C. or even to 2000° C., in order to enhance the thermal efficiency of the turbine by increasing the temperature of the coolant, the crucibles 10 may be arranged in the manner illustrated in FIG. 4. In order to avoid softening and even melting of the tubes 2, adjusting rings 13 are arranged between the inner walls of the tubes 2 and the crucibles 10 with a given suitable amount of play with a view to expansion, which rings may, for example, be shaped in the form shown in FIG. 4. These rings may be made advantageously of alumina. The presence of these rings brings about an adequate temperature gradient between the crucibles 10 and the tubes 2, so that the material of the tubes does not attain the softening temperature, although the crucibles are heated to very high temperatures. With a given embodiment the crucibles 10 have an outer diameter of the order of 3 to 4 cms. and an inner diameter of the order of 2 to 3 cms. The quartz glass sheath 2 has an inner diameter of 7 cms. and an outer diameter of 8 cms. The energy radiated by the graphite crucibles may attain a value of 100 w./cm.$^2$. About 80% thereof is allowed to pass through the sheath 2.

Figures 5, 6:
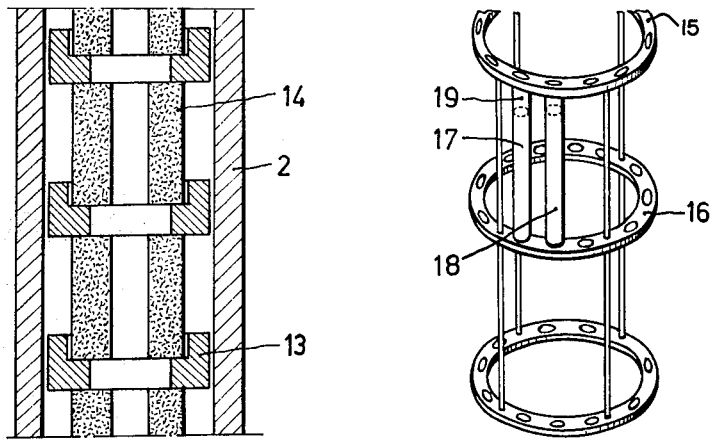
FIG. 6 shows a device in which fuel elements according to the invention are arranged.

FIG. 5 shows a further embodiment of the invention, in which the compressed, sintered or not sintered fuel, in the form of small blocks 14, preferably in the form of rings, is arranged directly on the adjusting rings 13, a suitable amount of play for expansion being taken into account. This arrangement also permits of increasing appreciably the temperature of the reactor, owing to the temperature gradient obtained by means of the adjusting rings, which also in this case, may be made from alumina.

FIG. 6 shows the application of the invention to the formation of a column of fuel elements. This embodiment consists of a given number of supports stacked up in the form of a cage (15 and 16). Each of these supports has at its periphery a given number of rods, of which only two (17 and 18) are shown in the figure for the sake of clarity. In accordance with the invention each of these rods is provided with a sheath of quartz or a different, suitable silicon compound, inside of which the fuel is provided, preferably in the form of a powder, of a compressed or a sintered mass. A space 19 is provided internally at the top end of each rod to admit the fission products. The rods have a height of, for example, 25 cms. and have a diameter of 1 cm., whilst the diameter of each support is 5 cms.

Figure 7:
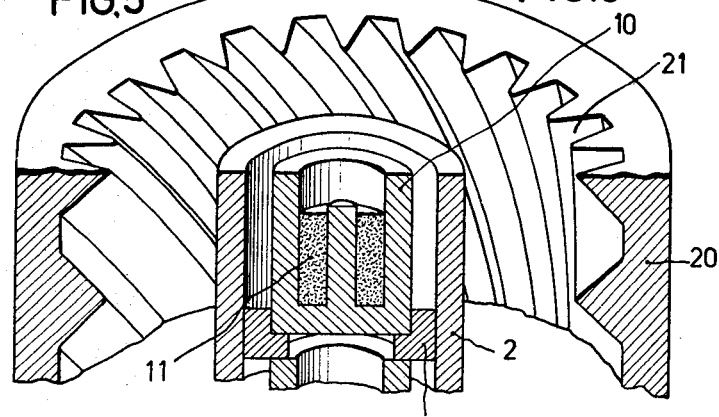
FIG. 7 shows a sectional view of part of a nuclear reactor according to the invention.

FIG. 7 shows a section view of part of a nuclear reactor according to the invention. It comprises a solid moderator 20, for example of graphite. In the moderator provision is made of a duct in which the fuel element, circumcirculated by the coolant, is arranged. This element comprises a sheath 2 of quartz glass, in which the fuel 11, for example uranium oxide in the form of powder is provided in a graphite crucible 10. The crucible 10 is held by the adjusting ring 13 of alumina spaced apart from the sheath 2. In order to enhance the heat contact between the moderator and the coolant, the wall of the duct is provided with tooth-like, screw-threaded extensions 21.

Figure 8:
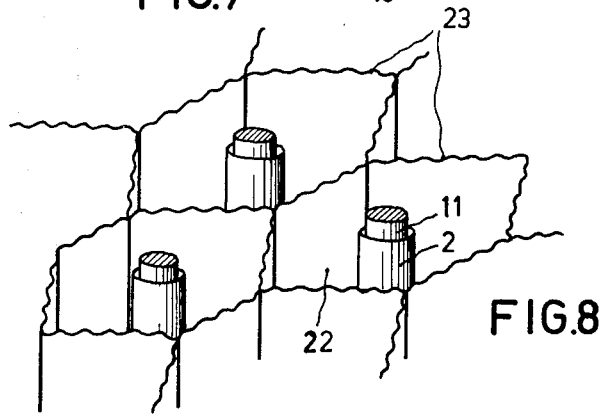
FIG. 8 is a diagrammatical, partly developed sectional view of part of a nuclear reactor according to the invention.

FIG. 8 shows in a diagrammatically, partly developed sectional view, part of a nuclear reactor according to the invention. The rod shaped fuel 11 is arranged in the sheath 2 of quartz glass, which is shown partly exploded in the figure at the top end. Each of these fuel elements is accommodated in a duct 22, formed by the walls 23. The coolant passes through the ducts 22. The walls 23 are corrugated and are made, for example of sheet iron which does not absorb infrared radiation and which is coated with a layer of aluminum treated in air at 700° C., which absorbs infrared radiation. This reactor does not comprise a moderator and is therefore a fast reactor.

What is claimed is:
1. A fuel element for a nuclear reactor comprising a supply of fissile material, and a quartz sheath permeable to infrared radiation surrounding and spaced from said fissile material.

2. A fuel element as claimed in claim 1 in which the quartz sheath is separated from the supply of fissile material by a member in contact with the inner surface of the sheath and the outer surface of the fissile material.

3. A fuel element as claimed in claim 2 in which a neutron absorbing fluid circulates between the quartz sheath and the fissile material.

4. A fuel element for a nuclear reactor comprising a supply of fissile material and a grating of corrosion-resistant material permeable to infrared radiation surrounding and spaced from said fissile material.

References Cited by the Examiner

UNITED STATES PATENTS

| | | |
|---|---|---|
| 2,728,867 | 12/1955 | Wilson. |
| 2,741,593 | 4/1956 | Metcalf et al. |
| 2,798,848 | 7/1957 | Kingdom. |
| 2,852,456 | 9/1958 | Wade. |
| 2,949,416 | 8/1960 | Wheelock. |
| 2,998,370 | 8/1961 | Gaunt et al. _____ 204—193.2 |
| 3,010,889 | 11/1961 | Fortescue et al. |
| 3,079,316 | 2/1963 | Johnson _____ 204—154.2 |
| 3,081,249 | 3/1963 | Whittemore _____ 204—154.2 |
| 3,085,059 | 4/1963 | Burnham _____ 204—154.2 |

FOREIGN PATENTS

| | | |
|---|---|---|
| 1,033,807 | 7/1958 | Germany. |
| 1,055,704 | 4/1959 | Germany. |
| 1,057,701 | 5/1959 | Germany. |
| 752,152 | 7/1956 | Great Britain. |
| 802,805 | 10/1958 | Great Britain. |

LEON D. ROSDOL, *Primary Examiner.*

ROGER L. CAMPBELL, OSCAR R. VERTIZ, REUBEN EPSTEIN, CARL D. QUARFORTH, *Examiners.*

R. L. GOLDBERG, R. W. MACDONALD, R. C. LYNE, L. D. RUTLEDGE, *Assistant Examiners.*